(12) United States Patent
Inagaki

(10) Patent No.: US 6,885,777 B2
(45) Date of Patent: Apr. 26, 2005

(54) APPARATUS AND METHOD OF DETERMINING IMAGE PROCESSING PARAMETER, AND RECORDING MEDIUM RECORDING A PROGRAM FOR THE SAME

(75) Inventor: Daisuke Inagaki, Osaka (JP)

(73) Assignee: Keyence Corporation, Osaka (JP)

(*) Notice: Subject to any disclaimer, the term of this patent is extended or adjusted under 35 U.S.C. 154(b) by 675 days.

(21) Appl. No.: 09/901,190

(22) Filed: Jul. 9, 2001

(65) Prior Publication Data

US 2002/0051570 A1 May 2, 2002

(30) Foreign Application Priority Data

Oct. 31, 2000 (JP) .................................... P.2000-333804

(51) Int. Cl.[7] .............................................. G06K 9/03
(52) U.S. Cl. ...................... 382/291; 382/287; 382/309
(58) Field of Search ............................... 382/181, 149, 382/309, 287, 291

(56) References Cited

U.S. PATENT DOCUMENTS 6,333,992 B1 * 12/2001 Yamamura et al. ......... 382/149
6,360,003 B1 * 3/2002 Doi et al. ................... 382/107
6,473,535 B1 * 10/2002 Takaoka ..................... 382/274
6,583,413 B1 * 6/2003 Shinada et al. ............. 250/310
2002/0145112 A1 * 10/2002 Davidson .................... 250/307

FOREIGN PATENT DOCUMENTS

JP          8-33005        2/1996
JP         10-124678       5/1998

* cited by examiner

*Primary Examiner*—Jon Chang
(74) *Attorney, Agent, or Firm*—Kilyk & Bowersox, P.L.L.C.

(57) ABSTRACT

A real picked-up image containing an image of a position detection mark 13 is picked up by an image pickup unit 1 and is stored in image memory 5 through an interface section 2. A CPU 6 generates a pseudo image on which change in the image pickup conditions is reflected from the stored real picked-up image and detects an image of an object using a predetermined image processing parameter from the generated pseudo image. If the object image is erroneously detected from the pseudo image, the image processing parameter is changed so that object image is not erroneously detected.

15 Claims, 10 Drawing Sheets

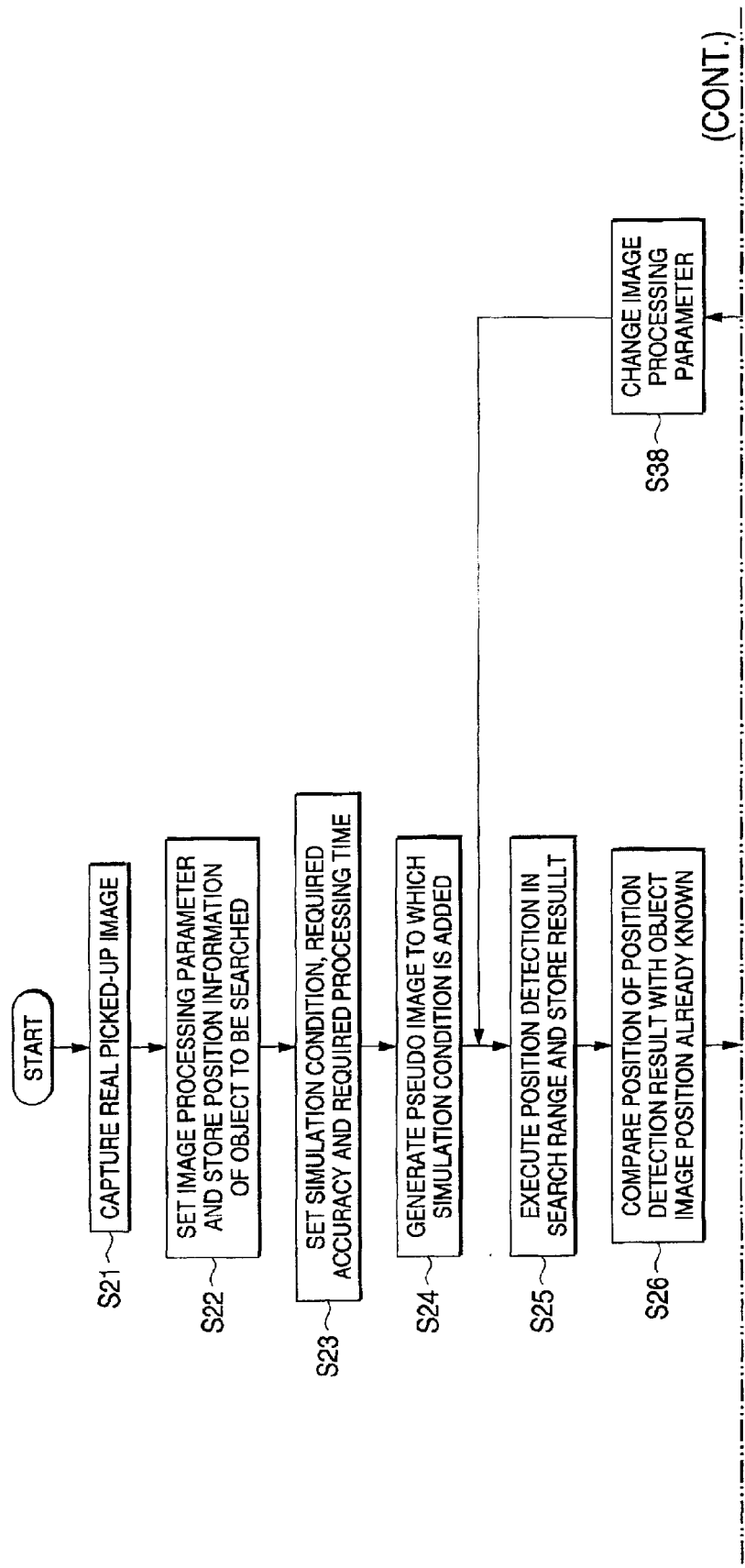

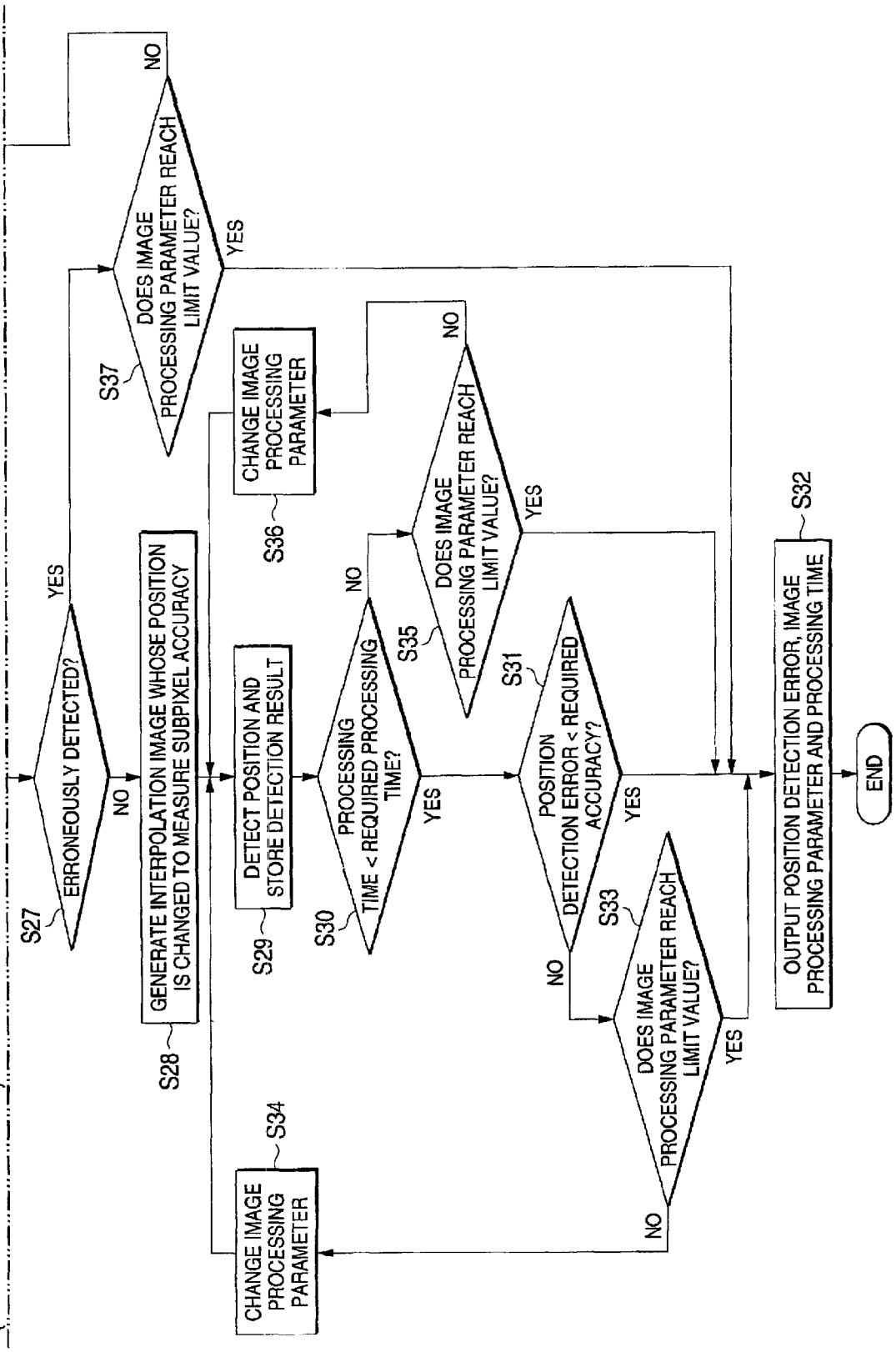

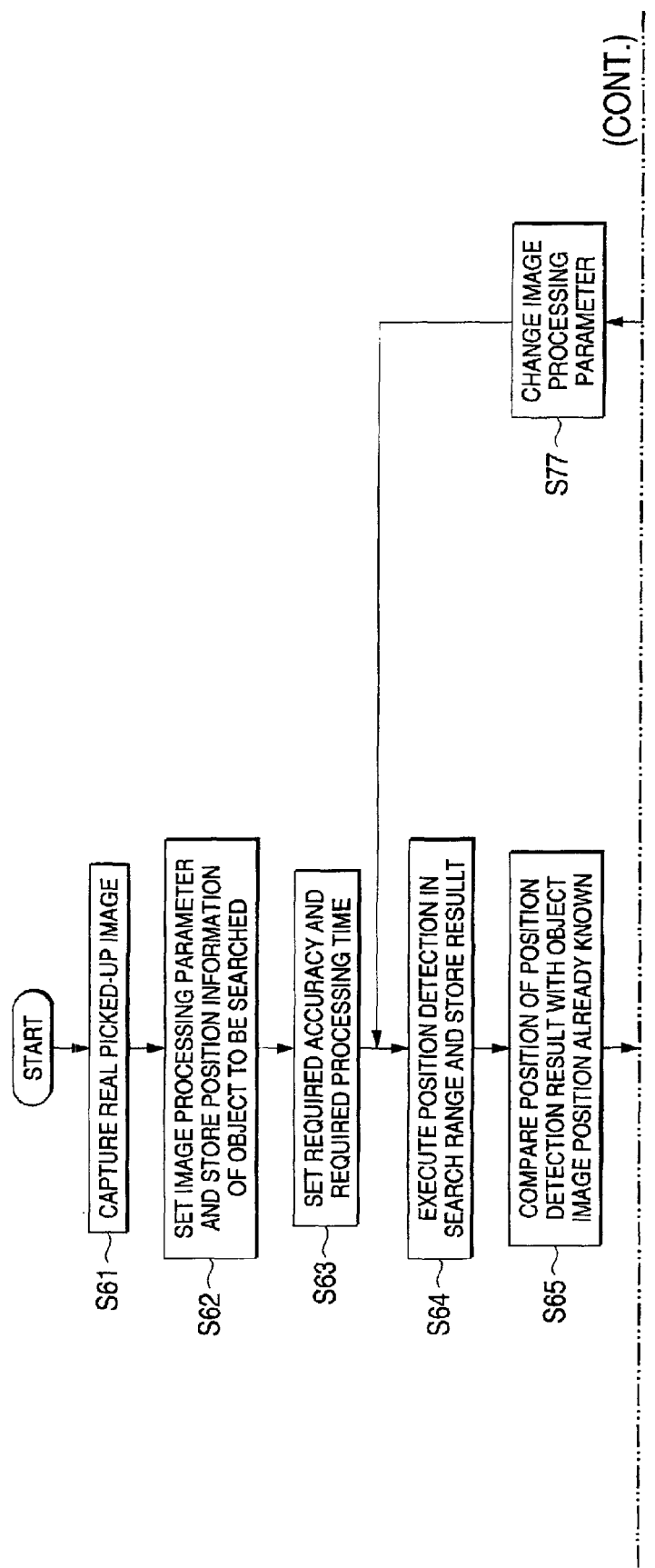

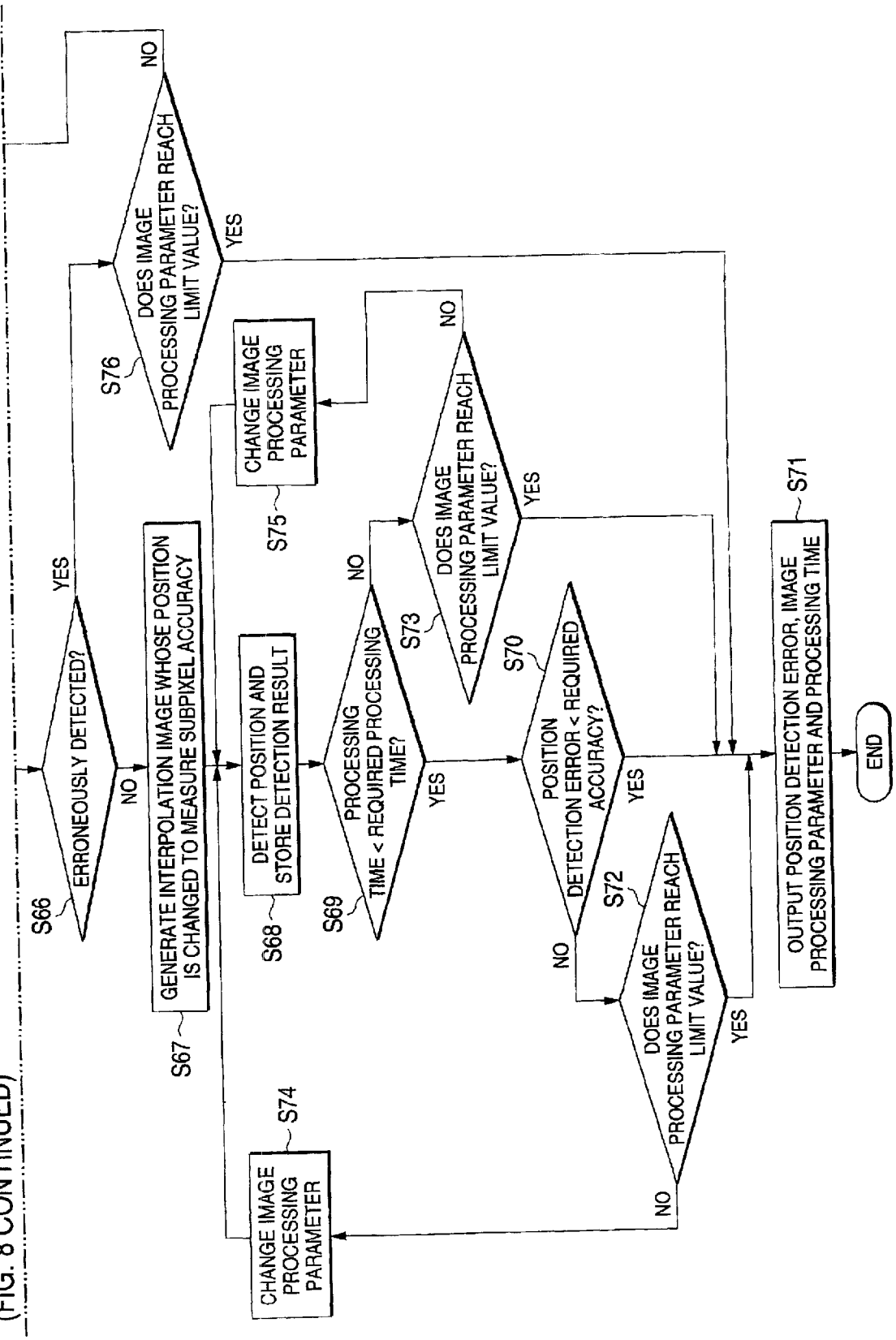

APPARATUS AND METHOD OF DETERMINING IMAGE PROCESSING PARAMETER, AND RECORDING MEDIUM RECORDING A PROGRAM FOR THE SAME

BACKGROUND OF THE INVENTION

1. Field of the Invention

This invention relates to an apparatus and a method of determining an image processing parameter used in a detection process for detecting an image of an object from a real picked-up image containing the object image, and a recording medium containing a program for determining the image processing parameter.

2. Description of the Related Art

Hitherto, an image processing apparatus, which picks up an image of an object with an image pickup unit such as a camera and detects the object from a real picked-up image containing the object image, has been used. For example, the image processing apparatus is used to detect the position of an object such as a position detection mark of a product, which is transported on a belt conveyor in a production line of a factory, and to execute the later steps using the detected position.

In the described image processing apparatus, a plurality of image processing parameters, such as a search skip width, image compression rate, etc., are used in the detection process for detecting the image of the object from the real picked-up image. In related art, an image processing apparatus, which functions as an apparatus for determining the image processing parameters, for example, obtains a correlation value for the real picked-up image with an image used as a reference for executing pattern matching, while the position of a real picked-up image to be searched is moved, and automatically determines a move distance as a search skip width when the correlation value falls to a predetermined value.

However, in the image processing apparatus of the related art, some of the image processing parameters are only determined automatically based on the correlation value, etc., and the image processing parameters cannot automatically be set for the detection accuracy of the most important performance in the detection process. Thus, the user changes the image processing parameters in various manners, actually measures the detection accuracy of the object, and corrects the image processing parameters by trial and error until the detection accuracy satisfies any desired detection accuracy. Thus, it takes a long time to optimize the image processing parameters and tuning of the image processing parameters is very intricate work.

In the case of an image processing apparatus in a manufacturing line of a factory, since a product is transported every given time, it is required that the object contained in the product be detected within a predetermined time. However, the image processing apparatus of the related art does not automatically optimize the image processing parameters for the detection processing time. Also, in this case, the user changes the image processing parameters so as to set any desired detection processing time by trial and error and thus takes a long time in correcting the image processing parameters.

Furthermore, in the case of an image processing apparatus in a factory, for example, as the brightness in the factor changes due to variations of weather conditions, time of day, illumination, and like, the image pick up conditions of the object may change. To optimize the image processing parameters in response to such change in the image pickup conditions, the user also corrects the image processing parameters by trial and error in a similar manner to that mentioned above, and thus takes a long time in optimizing the image processing parameters in response to change in the image pickup conditions; the job becomes a burden to the user.

SUMMARY OF THE INVENTION

It is therefore a first object of the invention to provide an apparatus and a method of determining an image processing parameter, and a recording medium for recording a program for determining the image processing parameter, which makes it possible to automatically optimize an image processing parameter in response to an assumed image pickup condition change without actually changing the image pickup conditions, and easily improving the detection accuracy of the object.

It is a second object of the invention to provide an apparatus for determining an image processing parameter, which makes it possible to automatically optimize the image processing parameter and set the detection accuracy and/or detection processing time of the object to any desired detection accuracy and/or any desired reference time.

(1) First Embodiment of the Invention

According to a first embodiment of the invention, there is provided an apparatus of determining an image processing parameter used for detecting an image of an object from a real picked-up image containing the image of the object. The apparatus comprises a capture section for capturing the real picked-up image, a generation section for processing the real picked-up image captured by the capture section to create a pseudo image on which change in an image pickup conditions is reflected, a detection section for detecting the image of the object from the pseudo image using an image processing parameter, and a change section has for changing the image processing parameter so that the image of the object is not erroneously detected if the detection section erroneously detected the image of the object from the pseudo image.

In the above-mentioned apparatus according to the invention, the real picked-up image is captured, the captured real picked-up image is processed to generate a pseudo image on which change in image pickup conditions is reflected, the image of the object is detected using the image processing parameter from the pseudo image, and the image processing parameter is changed so that the image of the object is not erroneously detected if the image of the object was erroneously detected from the pseudo image.

Thus, if the image of the object is erroneously detected from the pseudo image on which change in the image pickup conditions relative to the real picked-up image is reflected, the image processing parameter is automatically changed and the detection accuracy of the object image in the later detection process can be improved. Accordingly, the image processing parameter can be automatically optimized in response to the assumed image pickup condition changes without actually changing the image pickup conditions, and the detection accuracy in response to the assumed image pickup condition change can be improved easily.

(2) Second Embodiment of the Invention

In an apparatus for determining an image processing parameter, according to a second embodiment of the invention, the configuration of the apparatus according to the first embodiment of the invention is used and the detection section calculates a detection error of the object image contained in the pseudo image using the image processing parameter, and, if the detection error does not satisfy a predetermined detection accuracy, the change section changes the image processing parameter, so that the detection error satisfies the detection accuracy.

In this case, a detection error of the image of the object contained in the pseudo image is calculated using the image processing parameter, and, if the calculated detection error does not satisfy a predetermined detection accuracy, the image processing parameter is automatically changed, so that the detection error satisfies the required detection accuracy. Therefore, the user simply sets any desired detection accuracy, whereby the image processing parameter satisfying the desired detection accuracy can be determined easily and in a short time in response to the assumed image pickup condition change, without actually changing the image pickup conditions.

(3) Third Embodiment of the Invention

In an apparatus for determining an image processing parameter, according to a third aspect of the invention, the apparatus according to the first or second embodiment of the invention is used and further comprises a first calculation section for calculating a detection processing time required for the detection section to detect the image of the object from the pseudo image using the image processing parameter, wherein if the detection processing time does not satisfy a predetermined reference time, the change section changes the image processing parameter, so that the detection processing time satisfies the reference time.

In this case, the detection processing time required for detecting the image of the object from the pseudo image using the image processing parameter is calculated, and, if the calculated detection processing time does not satisfy a predetermined reference time, the image processing parameter is automatically changed so that the detection processing time satisfies the required reference time. Therefore, the user simply sets any desired reference time, whereby the image processing parameter for enabling detection processing to be completed within the desired reference time can be determined easily and in a short time in response to the assumed image pickup condition change, without actually changing the image pickup conditions.

(4) Fourth Embodiment of the Invention

According to a fourth aspect of the invention, there is provided an apparatus of determining an image processing parameter used for detecting an image of an object from a real picked-up image containing the image of the object. The image processing parameter determination apparatus comprises a capture section for capturing the real picked-up image, a detection section for detecting the image of the object from the real picked-up image using an image processing parameter, and a change section for changing the image processing parameter, so that a detection error and/or detection processing time satisfies a predetermined detection accuracy and/or a predetermined reference time, when the detection section detects the image of the object from the real picked-up image.

In the above-mentioned apparatus according to the invention, the real picked-up image is captured, the object image is detected using the image processing parameter from the captured real picked-up image, and the image processing parameter is automatically changed, so that a detection error and/or detection processing time satisfies a predetermined detection accuracy and/or a predetermined reference time when the image of the object is detected from the real picked-up image. Therefore, the user simply sets any desired detection accuracy and/or detection processing time, whereby the image processing parameter can be automatically optimized, and the detection accuracy and/or detection processing time of the object can be set to desired detection accuracy and/or any desired reference time.

(5) Fifth Embodiment of the Invention

According to a fifth embodiment of the invention, there is provided a method of determining an image processing parameter for detecting an image of an object from a real picked-up image containing the image of the object. The method comprises the steps of capturing the real picked-up image, processing the captured real picked-up image to create a pseudo image on which change in image pickup conditions is reflected, detecting the image of the object from the pseudo image using the image processing parameter, and changing the image processing parameter so that the image of the object is not erroneously detected, if the image of the object was erroneously detected from the pseudo image in the object image detecting step.

In the above-mentioned method according to the invention, the real picked-up image is captured, the captured real picked-up image is processed to generate a pseudo image on which change in the image pickup conditions is reflected, the image of the object is detected using the image processing parameter from the pseudo image, and the image processing parameter is changed so that the image of the object is not erroneously detected, if the image of the object was erroneously detected from the pseudo image.

Thus, if the image of the object is erroneously detected from the pseudo image on which change in the image pickup conditions relative to the real picked-up image is reflected, the image processing parameter is automatically changed and the detection accuracy of the object image in the later detection process can be improved. Accordingly, the image processing parameter can be automatically optimized in response to assumed image pickup condition change, without actually changing the image pick up conditions, and the detection accuracy of the object in response to the assumed image pickup condition change can be improved easily.

(6) Sixth Embodiment of the Invention

According to a sixth embodiment of the invention, there is provided a computer-readable recording medium recording a program for determining an image processing parameter used for detecting an image of an object from a real picked-up image containing the image of the object. The program causes a computer to execute the steps of capturing the real picked-up image, processing the captured real picked-up image to create a pseudo image on which change in image pickup conditions is reflected, detecting the image of the object from the pseudo image using the image processing parameter, and changing the image processing parameter, so that the image of the object is not erroneously detected, if the image of the object was erroneously detected from the pseudo image.

According to the above-mentioned embodiment of the invention, the real picked-up image is captured, the captured real picked-up image is processed to generate a pseudo image on which change in the image pickup conditions is reflected, the image of the object is detected using the image processing parameter from the pseudo image, and the image processing parameter is changed so that the image of the object is not erroneously detected if the image was erroneously detected from the pseudo image.

Thus, if the image of the object is erroneously detected from the pseudo image on which change in the image pickup conditions relative to the real picked-up image is reflected, the image processing parameter is automatically changed and the detection accuracy of the object image in the later detection process can be improved. Accordingly, the image processing parameter can be automatically optimized in response to the assumed image pickup condition change, without actually changing the image pickup conditions, and the detection accuracy of the object responsive to the assumed image pickup condition change can be improved easily.

BRIEF DESCRIPTION OF THE DRAWINGS

FIG. 6 is a flowchart to describe a second embodiment of an image processing parameter determination process of the image processing apparatus shown in FIG. 1;

FIG. 8 is a flowchart to describe a fourth embodiment of an image processing parameter determination process of the image processing apparatus shown in FIG. 1.

DETAILED DESCRIPTION OF THE PREFERRED EMBODIMENT

An image processing apparatus, which picks up an image of an object in a production line of a factory, etc., and detects the object image from a real picked-up image containing the object image, will be discussed as an embodiment of an image processing parameter determination apparatus according to the invention. For example, the image processing apparatus is used for various applications including presence or absence inspection of sell-by date, substrate hole inner diameter measurement, sheet material width measurement, lead pitch measurement, wiring cable detachment detection, robot handling control, etc. However, the image processing apparatus according to the invention is not limited to the above-mentioned embodiment applications; the invention can be applied to various image processing apparatus for detecting the position of an object, inspecting an object, etc.

Figure 1:
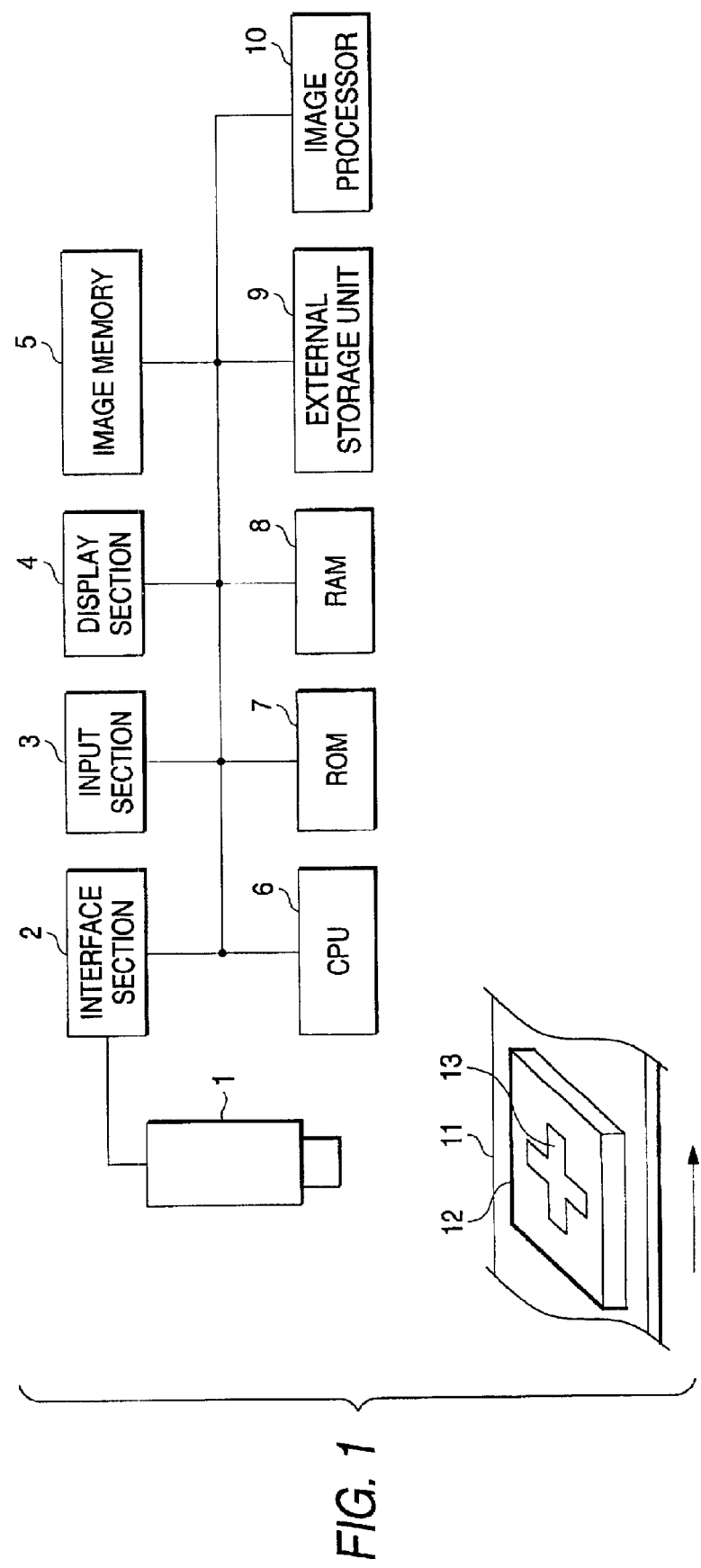
FIG. 1 is a block diagram to show the configuration of an image processing apparatus according to one embodiment of the invention.

FIG. 1 is a block diagram to show the configuration of an image processing apparatus according to one embodiment of the invention. The image processing apparatus shown in FIG. 1 comprises an image pickup unit 1, an interface section 2, an input section 3, a display section 4, an image memory 5, a CPU (central processing unit) 6, ROM (read-only memory) 7, RAM (random access memory) 8, and an external storage unit 9. The image memory 5 may be provided as a part of the RAM 8. The image processing apparatus may further include an image processor 10.

As shown in FIG. 1, a circuit board 12 formed with a position detection mark 13 as an object which is shaped substantially like a cross, is placed on a conveyor 11 in a production line of a factory and is transported in the arrow direction in the figure.

The image pickup unit 1 is composed of, for example, a two-dimensional image pickup unit of an area sensor, a line sensor, etc., consisting of CCD (charge-coupled device), etc. When a detection apparatus (not shown) detects the circuit board 12 being transported to a predetermined position, the image pickup unit 1 picks up an image of the circuit board 12 containing the position detection mark 13 and outputs an image signal corresponding to the real picked-up image picked up by the image pickup unit 1 to the interface section 2.

The image processing apparatus according to the invention is not limited to the apparatus containing an image pickup unit as shown in the embodiment; for example, it may be configured as an image processing apparatus wherein a real picked-up image picked up by a separate image pickup unit is stored on a predetermined storage medium, etc., the real picked-up image read from the storage medium, etc., and then is processed.

The interface section 2, the input section 3, the display section 4, the image memory 5, the CPU 6, the ROM 7, the RAM 8, and the external storage unit 9 are connected to each other by a predetermined bus and the CPU 6 controls the operation of the components.

The interface section 2 converts an image signal output from the image pickup unit 1 from an analog signal into a digital signal and stores the image signal in the image memory 5 under the control of the CPU 6. The interface section 2 and the image memory 5 may be connected directly and the image signal, namely, the real picked-up image, etc., may be stored directly in the image memory 5 from the interface section 2.

The input section 3 is made up of a keyboard, a mouse, etc., and is used by the user for entering various commands, etc.

The display section 4 is composed of a CRT (cathode-ray tube), a liquid crystal display, etc., for displaying a real picked-up image, a pseudo image, and the like described later and also displaying a position detection error, etc., described later on various display screens. The unit for presenting a position detection error, etc., to the user is not limited to this embodiment and may be an output unit such as a printer, if it can inform the user of a position detection error, etc.

The image memory 5 is composed of, for example, a semiconductor storage unit, etc., appropriate for storing a two-dimensional image. The image memory 5 stores a real picked-up image, a pseudo image, and the like described later, and outputs each stored image as required under the control of the CPU 6.

A system program is stored in the ROM 7. The external storage unit 9 is composed of a hard disk drive, etc., for storing an image processing parameter determination program, image processing parameters, and the like for performing image processing parameter determinations described later. A recording medium drive such as a CD-ROM drive or a floppy disk drive, may be used as the external storage unit for recording the image processing parameter determination program on a recording medium such as CD-ROM or floppy disk, and reading the image processing parameter determination program from the recording medium.

The CPU 6 executes the image processing parameter determination program stored in the external storage unit 9 on the RAM 8 and controls the operation of the components.

The RAM 8 is used as a work area of the CPU 6, etc. The image processor 10 may execute the image processing parameter determination program.

In one embodiment, the image pickup unit 1 and the interface section 2 correspond to capture section, the image memory 5 and the CPU 6 correspond to generation section, and the CPU 6 corresponds to detection section and change section. The CPU 6 also corresponds to calculation unit.

Figure 2:
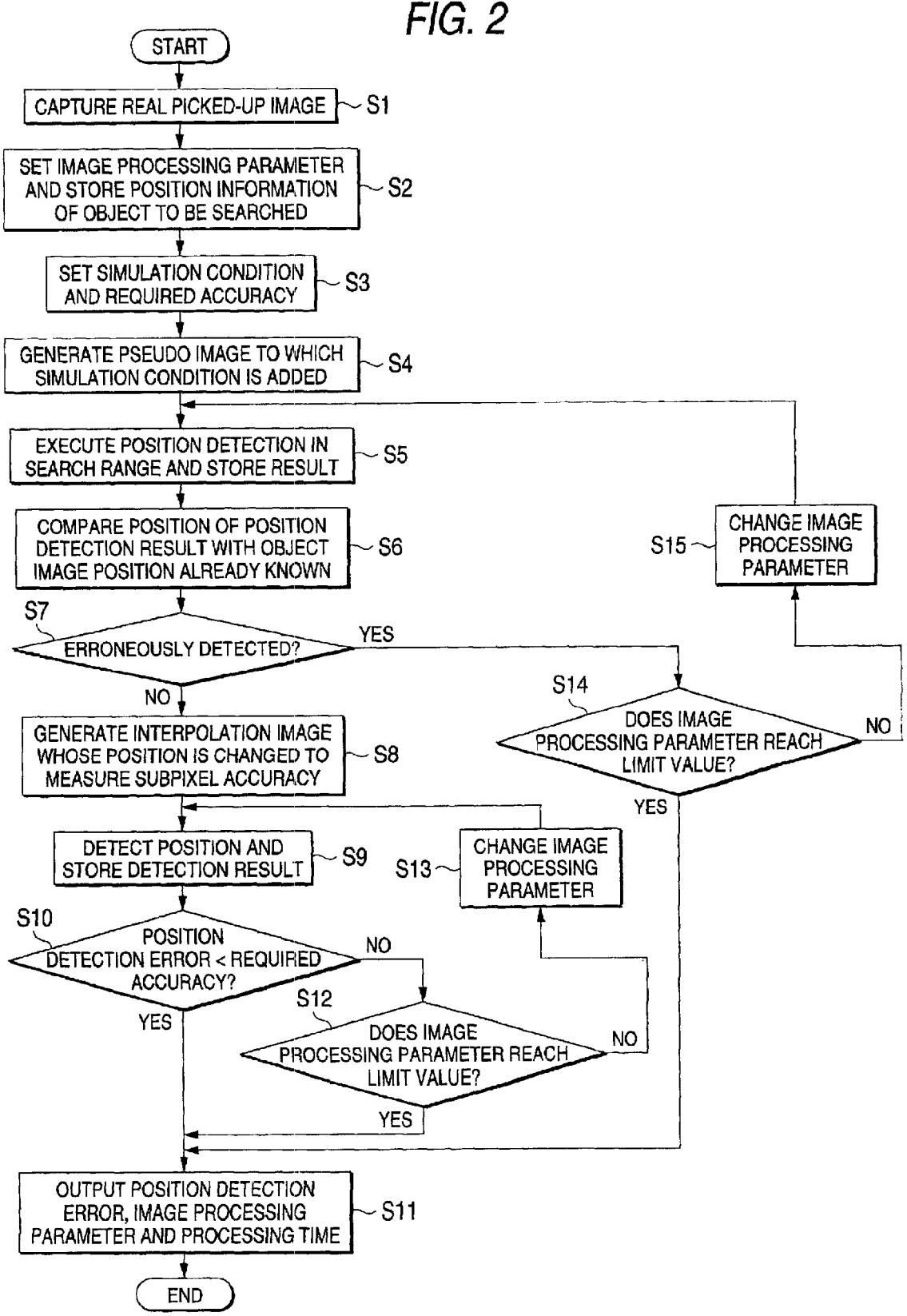
FIG. 2 is a flowchart to describe a first embodiment of the image processing parameter determination process of the image processing apparatus shown in FIG. 1.

Next, a first embodiment of the image processing parameter determination operation of the image processing apparatus described above will be discussed. FIG. 2 is a flowchart to describe the first embodiment of the image processing parameter determination processing of the image processing apparatus shown in FIG. 1.

First, at step S1, the image pickup unit 1 picks up a real picked-up image containing an image of the position detection mark 13 and the CPU 6 stores the real picked-up image input via the interface section 2 in the image memory 5.

Figure 3:
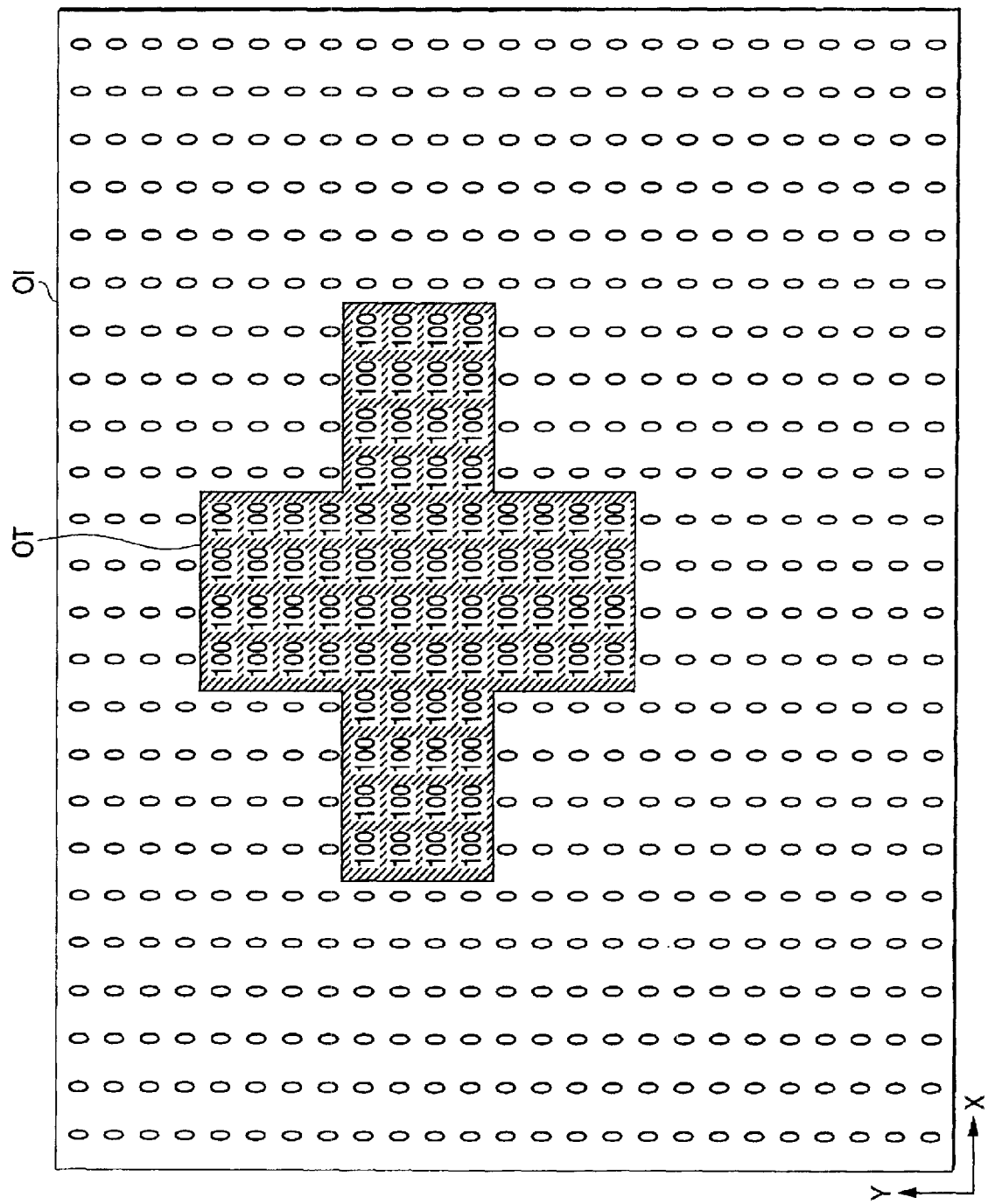
FIG. 3 is a drawing to schematically show an embodiment of a real image picked up by an image pickup unit shown in FIG. 1.

FIG. 3 is a drawing to schematically show an embodiment of a real picked-up image picked up by the image pickup unit 1 shown in FIG. 1.

A real picked-up image containing an image of the position detection mark 13 is picked up by the image pickup unit 1, an image signal is converted into a digital signal by the interface section 2, and real picked-up image OI, for example, shown in FIG. 3 is stored in the image memory 5.

In the embodiment shown in FIG. 3, the real picked-up image OI containing an image OT of the position detection mark 13 is shown, and each numeric value in the figure represents the brightness at the corresponding position. 100 is shown as the brightness of the image OT of the position detection mark 13, and 0 is shown as the brightness of the background other than the position detection mark 13. In this case, a portion high in brightness is detected according to the image processing parameter determination described later, whereby the image OT of the position detection mark 13 can be detected from the real picked-up image OI.

Next, the user uses the input section 3 to select any desired image processing parameter from among a plurality of image processing parameters contained in the image processing program stored in the external storage unit 9, and enters the position information and the search range of the image of the position detection mark 13 to be searched, contained in the real picked-up image. At step S2 the CPU 6 sets the selected image processing parameter as the image parameter to be used for the later position detection process and also sets the entered position information and search range of the image of the position detection mark 13 as the reference position, and the search range of the image of the position detection mark 13 in the later position detection process.

The image processing parameters will be discussed in detail. The image processing parameters, which are parameters used for position detection processes of an object, include detection algorithm, reference pixel, number of searched objects, correlation threshold value, number of search steps, image compression rate, presence or absence of interpolation at image compression time, search skip width, correlation threshold value of search skip transition, angle skip width of angle detection, contrast inversion correspondence, brightness difference, subpixel calculation method, and the like parameters; each parameter changes in response to the used position detection algorithm, or the like.

The number of searched objects is the number returned as the result of searching images of objects and specifies how many objects exist in the search range, etc.

The correlation threshold value is the minimum correlation value (index indicating the similarity degree) to search an image of an object and recognize it as an object; only an object exceeding the correlation threshold value is returned as the search result.

The number of search steps is the number specifying the number of steps when the search process is divided into a plurality of steps for execution; various values are set in response to the size of the search area, the required detection processing time, etc. The number of search steps generally is set from two to four so that a coarse search is executed initially and then tighter search is executed later.

The image compression rate is a value for determining how much the image to be searched is to be compressed, and can be set for an X-axis, for a Y-axis, and for each step. Normally, to shorten the detection processing time, the image to be processed is compressed and processed and the compression degree relates to the steps of the search process. For example, the image is compressed to 1/16 (image compression rate 16) at the first step, is compressed to 1/4 (image compression rate 4) at the next stage, and is compressed to 1/1 (no compression, namely, image compression rate 1) at the last stage. As the image compression rate is enlarged, the detection processing time is shortened, but erroneous detection may occur.

The presence or absence of interpolation at image compression time is a parameter for specifying compression processing with pixels either simply thinned out or the interpolation processing of calculating an average of nearby pixels when the above-mentioned compression processing is performed. If interpolation processing is not performed, the detection processing time is shortened, but the detection process is susceptible to quantization error and erroneous detection may occur.

The search skip width is a skip width for searching an image while skipping a given spacing without searching all area of the image, and can be set for the X-axis, for the Y-axis, and for each step. If the spacing of the search skip width is set large, the detection processing time is shortened, but erroneous detection may occur.

The correlation threshold value of the search step transition is the threshold value of the correlation value for making a transition to the next step when the search process is divided into a plurality of steps. If as many objects each having the specified correlation threshold value as the number of searched objects are found, the processing at the current step is stopped at that time and proceeds to processing at the next step. This eliminates the need for searching all ranges of the image to be searched and the detection processing time is shortened, but erroneous detection may occur if the correlation threshold value is set incorrectly.

The angle skip width of angle detection is a value to specify the angle interval to execute a search in a rotation direction, and is set for each step. If the angle skip width is set large, the detection processing time is shortened, but erroneous detection may occur.

The contrast inversion correspondence is a parameter for specifying whether or not contrast inversion is enabled.

The brightness difference is the tolerance of the brightness difference between the corresponding pixels. To add the brightness difference to determination of an object, the value of the brightness difference is set small.

The subpixel calculation method is a parameter to set an algorithm for calculating the position of the image of an object with a resolution of one pixel or less. A predetermined algorithm is selected from among a plurality of algorithms in response to the required detection accuracy and detection processing time.

Next, the user uses the input section 3 to select any desired simulation condition from among a plurality of simulation conditions and enter his or her required position detection accuracy. At step S3 the CPU 6 sets the selected simulation condition as the simulation condition used for the later image processing and also sets the entered position detection accuracy as the required accuracy used as the determination criterion of the later processing.

The simulation conditions will be discussed in detail. The simulation condition is a condition used to generate a pseudo image by simulation. On the pseudo image, change in the image pickup conditions relative to the real picked-up image is reflected. Namely, the pseudo image is an image almost equal to the image picked up in the image pick up condition, but changed from the image pickup conditions of the real picked-up image. The change in the image pickup conditions includes change in the image pickup environment, change in the object state, and the like; for example, it is geometric change in the image size, and the like, linear change and nonlinear change of brightness, change caused by concealing, change caused by dirt, and change caused by the like conditions.

In one embodiment, as selectable simulation conditions, image processing programs of random noise, shading, defocus, concealing, dirt, and the like, are contained in the image processing parameter determination program. One or more of the simulation conditions are used in combination in response to an assumed image pickup condition change, and the degree of each simulation condition is set to any desired value, whereby the pseudo image on which change in the image pickup conditions relative to the real picked-up image is reflected can be generated.

The random noise is the process of virtually creating a state in which noise occurs in an image. Shading is the process of multiplying the brightness of each pixel by a predetermined coefficient and virtually creating a state in which the brightness of an image changes from one position to another. Defocus is the process of virtually creating a state in which an out-of-focus condition occurs. Concealing is the process of overwriting a part of the image of an object with the specified brightness and virtually creating a state in which a part of the object is concealed. Dirt is the process of virtually creating a state in which the object, etc., is dirty.

Next, at step S4, the CPU 6 reads the real picked-up image stored in the image memory 5, generates a pseudo image to which the setup simulation condition is added, and stores the generated pseudo image in the image memory 5.

Figure 4:
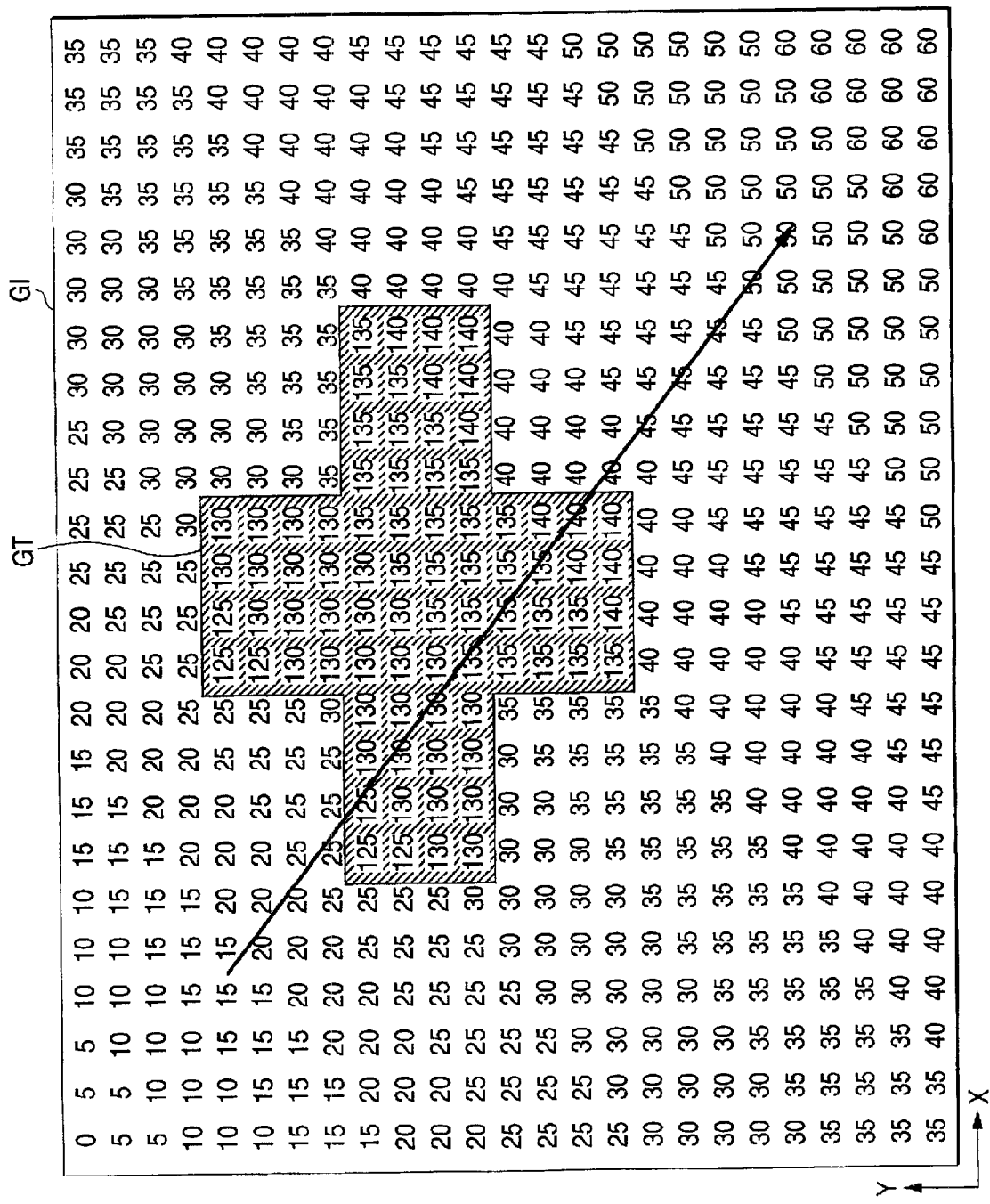
FIG. 4 is a drawing to schematically show an embodiment of a pseudo image provided by shading the real picked-up image shown in FIG. 3.

FIG. 4 is a drawing to schematically show an embodiment of a pseudo image provided by shading the real picked-up image shown in FIG. 3. If shading or changing the whole brightness in the arrow direction in the figure, for example, is performed for the real picked-up image OI shown in FIG. 3, a pseudo image GI and an image GT of the position detection mark 13 with the brightness value incremented sequentially by a predetermined value along the arrow direction can be generated, and the pseudo image GI changed in brightness from the real picked-up image OI can be generated, as shown in FIG. 4.

Next, at step S5, the CPU 6 reads the pseudo image stored in the image memory 5, executes the position detection process for the search range of the read pseudo image using the image processing parameter set at step S2, detects the position of the image of the position detection mark 13, and stores the detection result in the RAM 8.

The position detection process is not limited if the position of an object can be detected; for example, the position of the object can be detected by pattern matching, the upper and lower limit values of data for determining a match may be set, and the image match degree may be determined by normalization correlation, and the like. Detection of an object is not limited to the detection based on the position mentioned above; the object maybe detected based on the contour, the area, the center of gravity, and the like parameters, of the object.

Next, at step S6, the CPU 6 reads the detection position of the image of the position detection mark 13 stored in the RAM 8, and compares the read detection position of the image of the position detection mark 13 with the reference position of the image of the position detection mark 13, set at step S2 and already known.

Next, at step S7, the CPU 6 determines whether or not the detection position of the image of the position detection mark 13 matches the reference position of the image of the position detection mark 13. If they do not match, the CPU 6 determines that the object is erroneously detected in the pseudo image, and goes to step S14; if they match, the CPU 6 determines that the object is correctly detected in the pseudo image, and goes to step S8.

If the CPU 6 determines that the object is erroneously detected, at step S14 the CPU 6 reads the limit value of the image processing parameter contained in the image processing parameter determination program stored in the external storage unit 9, and determines whether or not the current setup image processing parameter reaches the limit value. If the setup image processing parameter reaches the limit value, the CPU 6 goes to step S11; if the setup image processing parameter does not reach the limit value, the CPU 6 goes to step S15.

If the image processing parameter does not reach the limit value, at step S15 the CPU 6 changes the image processing parameter, so that the object is not erroneously detected, and goes to step S5. After this, position detection process of the object from the pseudo image is executed based on the changed image processing parameter, and if it is determined that the object was erroneously detected as the detection result, the image processing parameter is changed accordingly. If the object is normally detected, the CPU 6 goes to step S8.

Next, if the CPU 6 determines at step S7 that the object is correctly detected from the pseudo image, the CPU 6 goes to step S8 and reads the pseudo image stored in the image memory 5, generates an interpolation image whose position is changed to measure subpixel accuracy from the read pseudo image, and stores the move distance at the time, that is, the distance between the interpolation image and the pseudo image, in the RAM 8.

Figure 5:
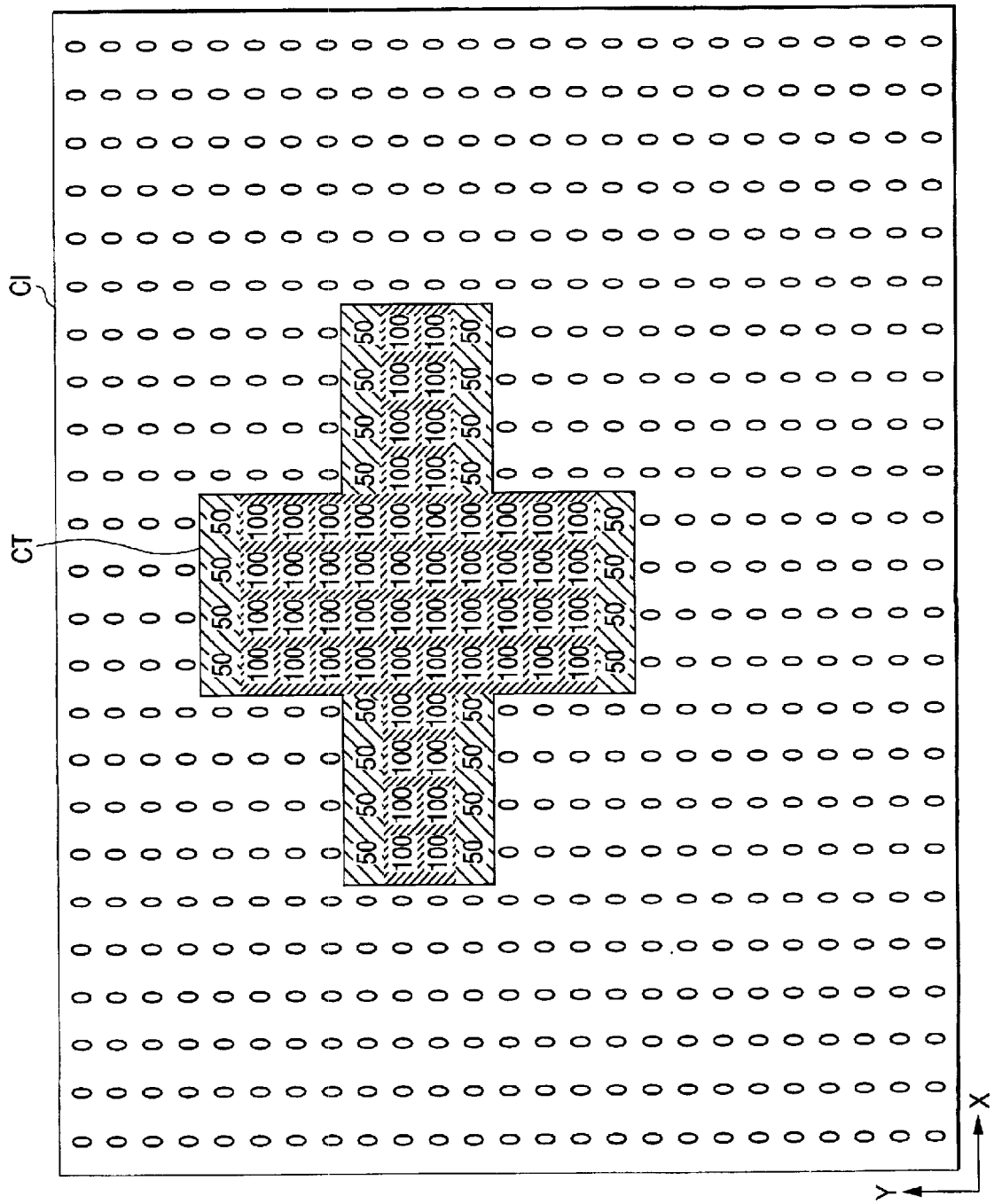
FIG. 5 is a drawing to schematically show an embodiment of an interpolation image whose position is changed from a pseudo image.

FIG. 5 is a drawing to schematically show an embodiment of the interpolation image whose position is changed from the pseudo image. For example, assuming that the real picked-up image OI shown in FIG. 3 is the read pseudo image, for example, if the position of the pseudo image is moved by 0.5 pixel in a downward direction in the figure (negative direction of the Y-axis shown in FIG. 3) by interpolation calculation, a pseudo image CI shown in FIG. 5 is generated.

In this case, the brightness of each upper side of the image OT of the position detection mark 13 shown in FIG. 3 is 100, but the brightness of each corresponding portion of an image CT of the position detection mark 13 shown in FIG. 5 is changed to 50. The brightness of each position just below each upper side of the image OT of the position detection mark 13 is 0, but the brightness of each corresponding portion of the image CT of the position detection mark 13 is changed to 50.

Therefore, an image CT moved downward by 0.5 pixel with respect to the image OT of the position detection mark 13 is generated and the pseudo image CI moved downward by 0.5 pixel with respect to the read pseudo image (real picked-up image OI) is generated.

Since the position detection process described later is performed for the generated pseudo image whose position is shifted, the pseudo image whose position is shifted needs to be sufficiently closely analogous to the original pseudo image. In one embodiment, to measure with subpixel accuracy for checking the detection accuracy of one pixel or less, as an interpolation method, for example, an interpolation method with a coefficient changed based on a bi-cubic interpolation method (tertiary convolution interpolation) is used. In this case, the pseudo image sufficiently closely analogous to the original pseudo image and shifted in position precisely by a predetermined amount can be generated, and the object position detection process described later can be executed with high accuracy.

The movement of the image used when a position detection error is calculated is not limited to the above-described embodiment; the image maybe moved in parallel along the X-axis, orthogonal to the Y-axis, and may be moved in a slanting direction in combination of both directions of the X and Y axes and various types of movement processing such as a rotation move of rotating the image by a predetermined angle from a predetermined center point may be performed. The move distance of the image is not limited if subpixel accuracy can be checked as position detection accuracy; various changes are possible.

Next, at step S9, the CPU 6 detects the position of the object from the generated interpolation image and stores the detection result in the RAM 8 to check the subpixel accuracy.

Next, at step S10, the CPU 6 calculates a position detection error from the difference between the move distance of the interpolation image stored in the RAM8 at step S8 and the object position detected at step S9, and determines whether or not the calculated position detection error is smaller than the required accuracy set at step S3. If the position detection error is smaller than the required accuracy, namely, the required accuracy is satisfied, the CPU 6 goes to step S11; if the position detection error is equal to or greater than the required accuracy, namely, the required accuracy is not satisfied, the CPU 6 goes to step S12.

If the required accuracy is not satisfied, at step S12 the CPU 6 determines whether or not the current setup image processing parameter reaches the limit value. If the setup image processing parameter reaches the limit value, the CPU 6 goes to step S11; if the setup image processing parameter does not reach the limit value, the CPU 6 goes to step S13.

If the image processing parameter does not reach the limit value, at step S13, the CPU 6 changes the image processing parameter so as to reduce the position detection error and goes to step S9. For example, the image processing parameter is changed so as to select an algorithm capable of calculating subpixels with higher accuracy in the subpixel calculation method, or lower the image compression rate for making subpixels finer.

Then, the object position detection process is executed from the interpolation image according to the changed image processing parameter, and if it is determined that the position detection error is equal to or greater than the required accuracy, the image processing parameter is changed accordingly. If the position detection error becomes smaller than the required accuracy, the CPU 6 goes to step S11.

On the other hand, if it is determined at step S10 that the position detection error is smaller than the required accuracy, the CPU 6 goes to step S11 and displays the calculated position detection error, the changed image processing parameter, and the detection processing time required if the position detection process is performed using the image processing parameter, on the display section 4 as numeric values, a graph, or the like.

If it is determined at step S12 that the image processing parameter reaches the limit value, the CPU 6 goes to step S11 and cannot further change the image processing parameter and thus displays the position detection error with the highest accuracy among the already calculated position detection errors, the corresponding detection processing time, and the image processing parameter used to measure the position detection error, on the display section 4 as numeric values, a graph, or the like.

In this case, the required accuracy set by the user cannot be satisfied, but if the limit value of the image processing parameter can be known, it can be used as reference data to adopt any other solution such as of raising the optical magnification of the image pickup unit 1 for capturing an image with a higher resolution or improving the illumination environment, so as to prevent change in brightness from occurring if shading is used as the simulation condition.

If it is determined at step S14 that the image processing parameter reaches the limit value, the CPU 6 goes to step S11 and displays a message of erroneous detection on the display section 4.

As described above, in the embodiment, if the object image is erroneously detected from the pseudo image on which change in the image pickup conditions relative to the real picked-up image is reflected, the image processing parameter is automatically changed and erroneous detection of the object image in the later detection process is prevented, so that the image processing parameter can be automatically optimized in response to the assumed image pickup condition change, without actually changing the image pickup conditions and the position detection accuracy of the object can be improved easily.

In one embodiment, a position detection error of the object image contained in the pseudo image is calculated using the image processing parameter, and, if the calculated position detection error does not satisfy the required accuracy, the image processing parameter is automatically changed, so that the position detection error has satisfied the required accuracy. Therefore, the user simply sets any desired required accuracy, whereby an image processing parameter satisfying the required accuracy can be determined easily and quickly in response to assumed image pickup condition change, without actually changing the image pickup conditions.

Next, a second embodiment of the image processing parameter determination operation of the image processing apparatus shown in FIG. 1 will be discussed. FIG. 6 is a flowchart to describe the second embodiment of the image processing parameter determination processing of the image processing apparatus shown in FIG. 1.

Steps S21, S22, S24 to S29, S31, S33, S34, S37, and S38 in the image processing parameter determination processing shown in FIG. 6 are similar to steps S1, S2, S4 to S9, S10, and S12 to S15 shown in FIG. 2 and therefore will not be discussed again in detail, but the characteristic processing of the image processing parameter determination shown in FIG. 6 will be discussed in detail.

First, at steps S21 and S22 shown in FIG. 6, similar processing to that at steps S1 and S2 shown in FIG. 2 is performed. Then, at step S23, the CPU 6 sets a simulation condition and required accuracy as at step S3 shown in FIG. 2 and when the user uses the input section 3 to enter the required detection processing time, the CPU 6 sets the entered detection processing time as the required processing time used as a determination criterion of the later processing.

Next, at steps S24 to S29, S37, and S38 shown in FIG. 6, similar processing to that at steps S4 to S9, S14, and S15 shown in FIG. 2 is performed. Then, at step S30, the CPU 6 calculates the detection processing time required for the object position detection process at step S29, and determines whether or not the calculated detection processing time is shorter than the required processing time set at step S23. If the detection processing time is shorter than the required processing time, namely, the required processing time is satisfied, the CPU goes to step S31; if the detection processing time is equal to or longer than the required processing time, namely, the required processing time is not satisfied, the CPU goes to step S35.

If the required processing time is not satisfied, at step S35 the CPU 6 determines whether or not the current setup image processing parameter reaches the limit value. If the setup image processing parameter reaches the limit value, the CPU 6 goes to step S32; if the setup image processing parameter does not reach the limit value, the CPU 6 goes to step S36.

If the image processing parameter does not reach the limit value, at step S36 the CPU 6 changes the image processing parameter so that the detection processing time is shortened, and goes to step S29. For example, the CPU 6 changes the image processing parameter so as to lessen the number of search steps, enlarge the image compression rate, etc.

Then, object position detection process is executed from the interpolation image according to the changed image processing parameter, and if it is determined that the detection processing time is equal to or longer than the required processing time, the image processing parameter is changed accordingly. If the detection processing time becomes shorter than the required processing time, the CPU 6 goes to step S31.

On the other hand, if it is determined at step S30 that the detection processing time is shorter than the required processing time, at steps S31, S33, and S34 the CPU 6 performs similar processing to that at steps S10, S12, and S13 shown in FIG. 2. If it is determined at step S31 that the position detection error is smaller than the required accuracy, the CPU 6 goes to step S32, and displays the calculated detection processing time and position detection error and the changed image processing parameter on the display section 4 as numeric values, a graph, or the like.

If it is determined at step S33, S35 that the image processing parameter reaches the limit value, the CPU 6 goes to step S32 and cannot further change the image processing parameter, and thus displays the shortest detection processing time and the position detection error with the highest accuracy among the already calculated detection processing times and position detection errors, and the image processing parameter used to measure the detection processing time and the position detection error on the display section 4, as numeric values, a graph, or the like. In this case, the required processing time and required accuracy set by the user cannot be satisfied, but the limit value of the image processing parameter can be known and can be used as reference data to adopt any other solution method.

If it is determined at step S37 that the image processing parameter reaches the limit value, the CPU 6 goes to step S32 and displays a message of erroneous detection on the display section 4.

As described above, in the embodiment, advantages similar to those in the first embodiment of the image processing parameter determination processing can be provided, and, in addition, the detection processing time required for finding the position of the object image contained in the pseudo image using the image processing parameter is calculated, and if the calculated detection processing time does not satisfy the required processing time, the image processing parameter is automatically changed, so that the detection processing time does satisfy the required processing time. Thus, the user simply sets any desired required processing time, whereby the image processing parameter for enabling position detection process to be completed within the required processing time can be determined easily and quickly in response to the assumed image pickup condition change, without actually changing the image pickup conditions.

Further, in the second embodiment, whether or not the required processing time is satisfied is also determined and then whether or not the required accuracy is satisfied is determined, so that the image processing parameter for the required processing time to take precedence over the required accuracy, can be set automatically. To determine whether or not the required processing time is satisfied after determining whether or not the required accuracy is satisfied, the image processing parameter for the required accuracy to take precedence over the required processing time can be set automatically.

Figure 7:
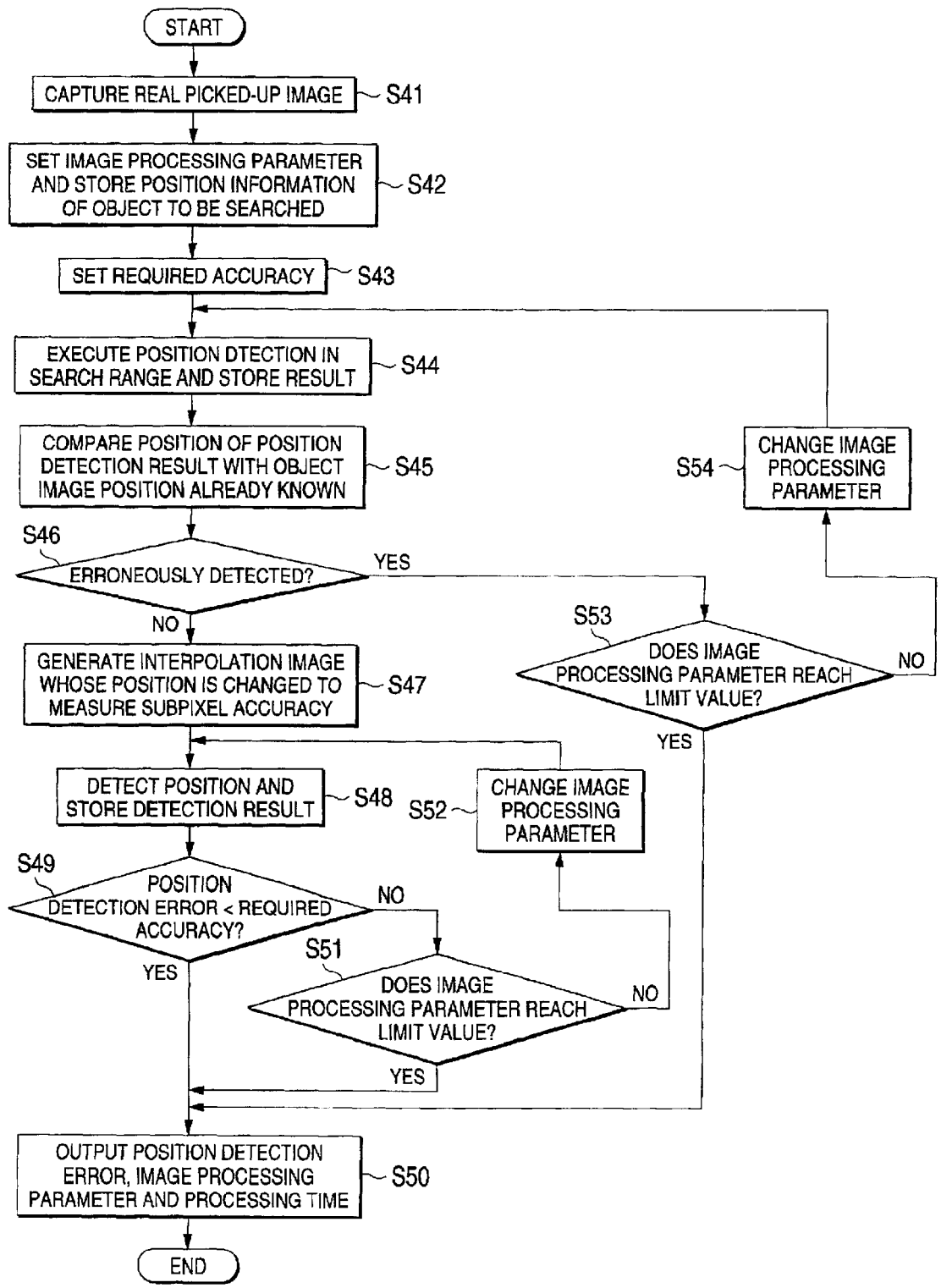
FIG. 7 is a flowchart to describe a third embodiment of an image processing parameter determination process of the image processing apparatus shown in FIG. 1.

Next, a third embodiment of the image processing parameter determination operation of the image processing apparatus shown in FIG. 1 will be discussed. FIG. 7 is a flowchart to describe the third embodiment of the image processing parameter determination of the image processing apparatus shown in FIG. 1.

First, at steps S41 and S42 shown in FIG. 7, similar processing to that at steps S1 and S2 shown in FIG. 2 is performed. Then, when the user uses the input section 3 to enter the required position detection accuracy, at step S43 the CPU 6 sets the entered position detection accuracy as the required accuracy used as a determination criterion of the later processing.

Next, at step S44, the CPU 6 reads the real picked-up image stored in the image memory 5, executes a position detection process for the search range of the read real picked-up image using the image processing parameter set at step S42, detects the position of the image of the position detection mark 13, and stores the detection result in the RAM 8.

Next, at step S45, the CPU 6 reads the detection position of the image of the position detection mark 13 stored in the RAM 8 and compares the read detection position of the image of the position detection mark 13 with the reference position of the image of the position detection mark 13 set at step S42 and already known.

Next, at step S46, the CPU 6 determines whether or not the detection position of the image of the position detection mark 13 matches the reference position of the image of the position detection mark 13. If the two positions do not match, the CPU 6 determines that the object is erroneously detected in the real picked-up image, and goes to step S53; if they match, the CPU 6 determines that the object is correctly detected in the real picked-up image, and goes to step S47.

If the CPU 6 determines that the object is erroneously detected, at step S53 the CPU 6 reads the limit value of the image processing parameter contained in the image processing parameter determination program stored in the external storage unit 9 and determines whether or not the current setup image processing parameter reaches the limit value. If the setup image processing parameter reaches the limit value, the CPU 6 goes to step S50; if the setup image processing parameter does not reach the limit value, the CPU 6 goes to step S54.

If the image processing parameter does not reach the limit value, at step S54 the CPU 6 changes the image processing parameter so that the object is not erroneously detected, and goes to step S44. After this step, the position detection process of the object from the real picked-up image is executed based on the changed image processing parameter and if it is determined that the object was erroneously detected as the detection result, the image processing parameter is changed accordingly. If the object is normally detected, the CPU 6 goes to step S47.

Next, if the CPU 6 determines at step S46 that the object is correctly detected from the real picked-up image, the CPU 6 goes to step S47 and reads the real picked-up image stored in the image memory 5, generates an interpolation image whose position is changed to measure subpixel accuracy from the read real picked-up image, and stores the move distance, that is, the distance between the interpolation image and the real picked-up image, at the time in the RAM 8.

Next, at step S48, the CPU 6 detects the position of the object from the generated interpolation image and stores the detection result in the RAM 8 to check the subpixel accuracy.

Next, at step S49, the CPU 6 calculates a position detection error from the difference between the move distance of the interpolation image stored in the RAM 8 at step S47 and the object position detected at step S48, and determines whether or not the calculated position detection error is smaller than the required accuracy set at step S43. If the position detection error is smaller than the required accuracy, namely, the required accuracy is satisfied, the CPU 6 goes to step S50; if the position detection error is equal to or greater than the required accuracy, namely, the required accuracy is not satisfied, the CPU 6 goes to step S51.

If the required accuracy is not satisfied, at step S51 the CPU 6 determines whether or not the current setup image processing parameter reaches the limit value. If the setup image processing parameter reaches the limit value, the CPU 6 goes to step S50; if the setup image processing parameter does not reach the limit value, the CPU 6 goes to step S52.

If the image processing parameter does not reach the limit value, at step S52 the CPU 6 changes the image processing parameter so as to reduce the position detection error and goes to step S48. After this, object position detection process is executed from the interpolation image according to the changed image processing parameter, and, if it is determined that the position detection error is equal to or greater than the required accuracy, the image processing parameter is changed accordingly. If the position detection error becomes smaller than the required accuracy, the CPU 6 goes to step S50.

On the other hand, if it is determined at step S49 that the position detection error is smaller than the required accuracy, the CPU 6 goes to step S50 and displays the calculated position detection error, the changed image processing parameter, and the detection processing time required if the position detection process is performed using the image processing parameter on the display section 4 as numeric values, a graph, or the like.

If it is determined at step S51 that the image processing parameter reaches the limit value, the CPU 6 goes to step S50 and cannot further change the image processing parameter and thus displays the position detection error with the highest accuracy among the already calculated position detection errors, the corresponding detection processing time, and the image processing parameter used to measure the position detection error on the display section 4 as numeric values, a graph, or the like.

If it is determined at step S53 that the image processing parameter reaches the limit value, the CPU 6 goes to step S50 and displays a message of erroneous detection on the display section 4.

As described above, in the embodiment, the object image is detected from the captured real picked-up image using the image processing parameter, and the image processing parameter is automatically changed so that the position detection error for detecting the object image from the real picked-up image satisfies the required accuracy. Thus, the user simply sets any desired required accuracy, whereby the image processing parameter can be automatically optimized and the position detection accuracy of the object can be set to the required accuracy.

Next, a fourth embodiment of the image processing parameter determination operation of the image processing apparatus shown in FIG. 1 will be discussed. FIG. 8 is a flowchart to describe the fourth embodiment of the image processing parameter determination of the image processing apparatus shown in FIG. 1.

Steps S61, S62, S64 to S68, S70, S72, S74, S76, and S77 in the image processing parameter determination processing shown in FIG. 8 are similar to steps S41, S42, S44 to S49, and S51 to S54 shown in FIG. 7 and therefore will not be discussed again in detail, but the characteristic processing of the image processing parameter determination shown in FIG. 8 will be discussed in detail.

First, at steps S61 and S62 shown in FIG. 8, similar processing to that at steps S41 and S42 shown in FIG. 7 is performed. Then, at step S63, the CPU 6 sets required accuracy as at step S43 shown in FIG. 7 and when the user uses the input section 3 to enter the required detection processing time, the CPU 6 sets the entered detection processing time as the required processing time used as a determination criterion of the later processing.

Next, at steps S64 to S68, S76, and S77 shown in FIG. 8, similar processing to that at steps S44 to S48, S53, and S54 shown in FIG. 7 is performed. Then, at step S69, the CPU 6 calculates the detection processing time required for the object position detection process at step S68 and determines whether or not the calculated detection processing time is shorter than the required processing time set at step S63. If the detection processing time is shorter than the required processing time, namely, the required processing time is satisfied, the CPU goes to step S70; if the detection processing time is equal to or longer than the required processing time, namely, the required processing time is not satisfied, the CPU goes to step S73.

If the required processing time is not satisfied, at step S73 the CPU 6 determines whether or not the current setup image processing parameter reaches the limit value. If the setup image processing parameter reaches the limit value, the CPU 6 goes to step S71; if the setup image processing parameter does not reach the limit value, the CPU 6 goes to step S75.

If the image processing parameter does not reach the limit value, at step S75 the CPU 6 changes the image processing parameter so that the detection processing time is shortened, and goes to step S68. After this, the object position detection process is executed from the interpolation image according to the changed image processing parameter, and, if it is determined that the detection processing time is equal to or longer than the required processing time, the image processing parameter is changed accordingly. If the detection processing time becomes shorter than the required processing time, the CPU 6 goes to step S70.

On the other hand, if it is determined at step S69 that the detection processing time is shorter than the required processing time, at steps S70, S72, and S74 the CPU 6 performs similar processing to that at steps S49, S51, and S52 shown in FIG. 7. If it is determined at step S70 that the position detection error is smaller than the required accuracy, the CPU 6 goes to step S71 and displays the calculated detection processing time and position detection error and the changed image processing parameter on the display section 4 as numeric values, a graph, or the like.

If it is determined at step S72, S73 that the image processing parameter reaches the limit value, the CPU 6 goes to step S71 and cannot further change the image processing parameter and thus displays the shortest detection processing time and the position detection error with the highest accuracy among the already calculated detection processing times and position detection errors, and also displays the image processing parameter used to measure the detection processing time, and the position detection error on the display section 4, as numeric values, a graph, or the like. In this case, the required processing time and required accuracy set by the user cannot be satisfied, but the limit value of the image processing parameter can be known and can be used as reference data to adopt any other solution method.

If it is determined at step S76 that the image processing parameter reaches the limit value, the CPU 6 goes to step S71 and displays a message of erroneous detection on the display section 4.

As described above, in the embodiment, advantages similar to those in the third embodiment of the image processing parameter determination processing can be provided, and, in addition, the detection processing time required for finding the position of the object image contained in the real picked-up image using the image processing parameter is calculated, and, if the calculated detection processing time does not satisfy the required processing time, the image processing parameter is automatically changed so that the detection processing time satisfies the required processing time. Thus, the user simply sets any desired required processing time, whereby the image processing parameter can be automatically optimized and the detection processing time can be set within the required processing time.

Further, in the fourth embodiment, whether or not the required processing time is satisfied is determined and then whether or not the required accuracy is satisfied is also determined, so that the image processing parameter for the required processing time to take precedence over the required accuracy can be set automatically. To determine whether or not the required processing time is satisfied after determining whether or not the required accuracy is satisfied, the image processing parameter for the required accuracy to take precedence over the required processing time can be set automatically.

The image processing parameter determination processing has been described as one function of the image processing apparatus, but the image processing parameter determination may be executed by an image processing parameter determination apparatus separate from the image processing apparatus, and the determined image processing parameter may be transmitted, etc., to the image processing apparatus for setting the optimized image processing parameter in the image processing apparatus.

What is claimed is:

1. An apparatus for determining an image processing parameter used for detecting an image of an object from a real picked-up image containing the image of the object, said apparatus comprising:
   a capture section for capturing the real picked-up image;
   a generation section for processing the captured real picked-up image to generate a pseudo image on which change in image pickup conditions relative to the real image is reflected;
   a detection section for detecting the image of the object from the pseudo image using an image processing parameter;
   a change section for changing the image processing parameter so that the image of the object is not erroneously detected when said detection section erroneously detects the image of the object from the pseudo image; and
   a comparison section for comparing a position of the image of the object contained in the pseudo image detected by said detection section and a reference position of the image of the object; and
   wherein said change section changes the image processing parameter so that the position of the image of the object contained in the pseudo image corresponds to the reference position when the position of the image of the object contained in the pseudo image does not correspond to the reference position.

2. The apparatus as claimed in claim 1, further comprising:
   an input section for inputting the image processing parameter used in said detection section,
   wherein said change section changes the image processing parameter automatically without re-input of the image processing parameter.

3. The apparatus as claimed in claim 1, further comprising:
   a first calculation section for calculating a detection error of the image of the object contained in the pseudo image using the image processing parameter,
   wherein said change section changes the image processing parameter so that the detection error satisfies a predetermined detection accuracy when the detection error does not satisfy the predetermined detection accuracy.

4. The apparatus as claimed in claim 1, further comprising:
   a second calculation section for calculating the detection processing time required for said detection section to detect the image of the object from the pseudo image using the image processing parameter,
   wherein said change section changes the image processing parameter so that the detection processing time satisfies a predetermined reference time when the detection processing time does not satisfy the predetermined reference time.

5. The apparatus as claimed in claim 1, further comprising:
a second calculation section for calculating the detection processing time required for said detection section to detect the image of the object from the pseudo image using the image processing parameter,
wherein said change section changes the image processing parameter so that the detection processing time satisfies a predetermined reference time when the detection processing time does not satisfy the predetermined reference time.

6. An apparatus for determining an image processing parameter used for detecting an image of an object from a real picked-up image containing the image of the object, said apparatus comprising:
a capture section for capturing the real picked-up image;
a detection section for detecting the image of the object from the captured real picked-up image using a image processing parameter,
a change section for changing the image processing parameter so that at least one of a detection error and a detection processing time obtained when the image of the object is detected by said detection section satisfies at least one of a predetermined detection accuracy and a predetermined reference time; and
a comparison section for comparing a position of the image of the object contained in the real picked-up image detected by said detection section and a reference position of the image of the object; and
wherein said change section changes the image processing parameter so that the position of the image of the object contained in the real picked-up image corresponds to the reference position when the position of the image of the object contained in the real picked-up image does not correspond to the reference position.

7. The apparatus as claimed in claim 6, further comprising:
an input section for inputting the image processing parameter used in said detection section,
wherein said change section changes the image processing parameter automatically without re-input of the image processing parameter.

8. A method for determining an image processing parameter used for detecting an image of an object from a real picked-up image containing the image of the object, said method comprising:
capturing the real picked-up image;
processing the captured real picked-up image to generate a pseudo image on which change in image pickup conditions relative to the real picked-up image is reflected;
detecting the image of the object from the pseudo image using a image processing parameter;
changing the image processing parameter so that the image of the object is not erroneously detected if the image of the object is erroneously detected from the pseudo image in said detection step; and
comparing a position of the image of the object contained in the pseudo image detected in said detection step and a reference position of the image of the object, and
wherein said changing of the image processing parameter further comprises changing the image processing parameter so that the position of the image of the object contained in the pseudo image corresponds to the reference position when the position of the image of the object contained in the pseudo image does not correspond to the reference position.

9. The method as claimed in claim 8, further comprising:
inputting the image processing parameter used in said detection step,
wherein said changing of the image processing parameter further comprises changing the image processing parameter automatically without re-input of the image processing parameter.

10. The method as claimed in claim 8, further comprising:
calculating a detection error of the image of the object contained in the pseudo image using the image processing parameter,
wherein said changing of the image processing parameter further comprises changing the image processing parameter so that the detection error satisfies a predetermined detection accuracy when the detection error does pot satisfy the predetermined accuracy.

11. The method as claimed in claim 8, further comprising:
calculating detection processing time required for said detection step to detect the image of the object from the pseudo image using the image processing parameter,
wherein said changing of the image processing parameter further comprises changing the image processing parameter so that the detection processing time satisfies a predetermined reference time when the detection processing time does not satisfy the predetermined reference time.

12. A method for determining an image processing parameter used for detecting an image of an object from a real picked-up image containing the image of the object, said method comprising:
capturing the real picked-up image;
detecting the image of the object from the captured real picked-up image using an image processing parameter;
changing the image processing parameter so that at least one of a detection error and a detection processing time obtained when the image of the object is detected in said detection step satisfies at least one of a predetermined detection accuracy and a predetermined reference time; and
comparing a position of the image of the object contained in the real picked-up image detected by said detection step and a reference position of the image of the object; and
wherein said changing of the image processing parameter further comprises changing the image processing parameter so that the position of the image of the object contained in the real picked-up image corresponds to the reference position when the position of the image of the object contained in the real picked-no image does not correspond to the reference position.

13. The method as claimed in claim 12, further comprising:
inputting the image processing parameter used in said detection step,
wherein said changing of the image processing parameter further comprises changing the image processing parameter automatically without re-input of the image processing parameter.

14. A recording medium recording a program for determining an image processing parameter for detecting an image of an object from a real picked-up image containing the image of the object, the program causing a computer to execute the steps of:

capturing the real picked-up image;

processing the captured real picked-up image to generate a pseudo image on which change in image pickup conditions relative to the real picked-up image is reflected;

detecting the image of the object from the pseudo image using an image processing parameter;

changing the image processing parameter so that the image of the object is not erroneously detected if the image of the object is erroneously detected from the pseudo image in said detection step; and calculating detection processing time required for said detection step to detect the image of the object from the pseudo image using the image processing parameter; and wherein said changing of the image processing parameter further comprises changing the image processing parameter so that the detection processing time satisfies a predetermined reference time when the detection processing time does not satisfy the predetermined reference time.

15. The recording medium as claimed in claim 14, wherein the program causes the computer to execute the additional steps of:

calculating a detection error of the image of the object contained in the pseudo image using the image processing parameter, wherein said changing of the image processing parameter further comprises changing the image processing parameter so that the detection error satisfies a predetermined detection accuracy when the detection error does not satisfy the predetermined detection accuracy.

* * * * *

UNITED STATES PATENT AND TRADEMARK OFFICE
CERTIFICATE OF CORRECTION

PATENT NO. : 6,885,777 B2
DATED : April 26, 2005
INVENTOR(S) : Inagaki

It is certified that error appears in the above-identified patent and that said Letters Patent is hereby corrected as shown below:

Column 20,
Line 22, "pot" should read -- not --.
Line 56, "picked-no" should read -- picked-up --.

Signed and Sealed this

Twenty-eighth Day of June, 2005

JON W. DUDAS
*Director of the United States Patent and Trademark Office*